(12) United States Patent
Hoffelner

(10) Patent No.: US 6,478,304 B1
(45) Date of Patent: Nov. 12, 2002

(54) SEALING RING FOR NON-HERMETIC FLUID SEALS

(75) Inventor: Herbert Hoffelner, Markt Indersdorf (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/787,237
(22) PCT Filed: Jul. 14, 2000
(86) PCT No.: PCT/DE00/02309

§ 371 (c)(1),
(2), (4) Date: Jun. 12, 2001

(87) PCT Pub. No.: WO01/06097

PCT Pub. Date: Jan. 25, 2001

(30) Foreign Application Priority Data

Jul. 16, 1999 (DE) .......................................... 199 33 445

(51) Int. Cl.[7] .............................................. F16J 15/44
(52) U.S. Cl. ...................................... 277/415; 277/421
(58) Field of Search ................................ 277/411, 412, 277/415, 421

(56) References Cited

U.S. PATENT DOCUMENTS

| | | | |
|---|---|---|---|
| 3,537,713 A | * | 11/1970 | Matthews et al. |
| 3,846,899 A | * | 11/1974 | Gross |
| 4,148,494 A | * | 4/1979 | Zelahy et al. |
| 4,227,703 A | * | 10/1980 | Stalker et al. |
| 4,390,320 A | * | 6/1983 | Eiswerth |
| 4,671,735 A | * | 6/1987 | Rossmann et al. |

FOREIGN PATENT DOCUMENTS

| | | | |
|---|---|---|---|
| DE | 43 41 216 | * | 6/1995 |
| DE | 197 30 008 | | 10/1998 |

* cited by examiner

*Primary Examiner*—Anthony Knight
*Assistant Examiner*—John L. Beres
(74) *Attorney, Agent, or Firm*—Crowell & Moring LLP

(57) ABSTRACT

A sealing ring is provided for non-hermetic fluid seals with a restricted passage between sealing elements rotating relative to one another the sealing has a carrier and at least one sealing rib extending radially on the outside or inside around the carrier. The edge of each rib forms a flow restriction with an opposing running in surface, with the sealing rib presenting an abrasive geometry. Each sealing rib has for the most part a smooth, rotationally symmetrical contour, and one or a few cutting elements are arranged at one or a few points on each sealing rib so that each element projects radially and axially on one or both sides from the sealing rib contour.

15 Claims, 1 Drawing Sheet

SEALING RING FOR NON-HERMETIC FLUID SEALS

BACKGROUND AND SUMMARY OF THE INVENTION

This application claims the priority of German Patent Document 199 33 445.5 filed in Germany on Jul. 16, 1999 and PCT/DE00/02309 filed in Germany on Jul. 14, 2000.

The invention relates to a sealing ring for non-hermetic fluid seals with a restricted passage between coaxial sealing elements rotating relative to one another especially as a rotating sealing element for labyrinth seals in gas turbine engines, with a carrier leading to at least one component and with at least one sealing rib extending radially outwards or inwards and around the entire carrier, the exposed, circumferential edge of which rib in operation forms a flow restriction with a running-in surface situated radially opposite, the sealing rib presenting an abrasive geometry to the running-in surface.

Thus German Patent Document DE 4341 216 C2 protects a seal component for controlled-gap or labyrinth seals having a coating composed of a compound containing metal and hard material particles, the latter being arranged in the form of regularly shaped bodies with leveled surfaces lying on the same level. This construction is intended to ensure that the running-in surface material is not only removed by abrasion but displaced by hot plastic flow. This presupposes a large amount of heat generated by friction, which can in turn damage the fin material.

Numerous measures are known, which are intended to remedy this problem and come under the term "fin tip armouring".

Thus DE 4341 216 C2 protects a seal component for controlled-gap or labyrinth seals having a coating composed of a compound containing metal and hard material particles, the latter being arranged in the form of regularly shaped bodies with levelled surfaces lying on the same level. This construction is intended to ensure that the running-in surface material is not only removed by abrasion but displaced by hot plastic flow. This presupposes a large amount of heat generated by friction, which can in turn damage the fin material.

German Patent Document DE 197 30 008 C1 protects armouring for a metal engine component, which is worked into a running-in surface as this is skimmed, comprises a ceramic layer and is profiled with peaks and intervening spaces for the discharge of abraded material, the profiling being created by deforming of the surface of the component prior to coating, preferably by knurling. The entire sealing fin is therefore constructed like a saw blade with a plurality of teeth uniformly distributed over its periphery, the surfaces of which teeth are ceramic-coated. This solution has the disadvantage, among others, that the many spaces between the teeth/tips generally impair the sealing effect. Owing to the small material cross sections in the tips and the punctual introduction of heat, local heat flux densities occur here, which may be higher than in the case of smooth sealing fins and hence very detrimental to the material grain structure. In addition, the V-shaped spaces having sharp edges at the foot form stress-increasing notches from which dangerous cracks can originate. A coarser toothing would be advantageous with a view to effective abrasion and hence a thermally non-critical running-in process. This is inconsistent with the need for a good sealing effect, so that in fact only a very fine, flat toothing can be used. In this respect, this solution also tends to result in a wear process with the thermal disadvantages already referred to.

This object is achieved by the sealing ring for non-hermetic fluid seals with a restricted passage between coaxial sealing elements rotating relative to one another, especially as a rotating sealing element for labyrinth seals in gas turbine engines, with a carrier leading to at least one component and with at least one sealing rib extending radially outwards or inwards and around the entire carrier, the exposed, circumferential edge of which rib in operation forms a flow restriction with a running-in surface situated radially opposite, the sealing rib presenting an abrasive geometry to the running-in surface, characterized in that the/each sealing rib has a smooth, rotationally symmetrical contour over the greater part of its periphery, and in that one or a few cutting elements are arranged at one or a few points on the/each sealing rib in such a way that each cutting element projects radially and axially on one or both sides from the contour of the sealing rib. a suitable , mechanically abradable running-in surface.

This object is achieved by the features characterized in claim 1, in conjunction with the generic features of its pre-characterizing clause.

The sealing ring according to the invention advantageously combines the features of a conventional design with at least one smooth, rotationally symmetrical sealing rib, and an abrasive design, one or a few cutting elements, which project from the sealing rib contour, being arranged at only one or a few discrete points on the sealing rib. The cutting elements are intended to be of a really cutting or chip-forming design and robust, that is mechanically resistant, so that sufficient surface material is abraded in the shortest possible time and without much friction work, thereby producing the desired clearance with the smooth, sealing contour of the sealing rib.

BRIEF DESCRIPTION OF THE DRAWINGS

A chip-forming machining process is known, which is referred to as "thread whirling" and which uses a hollow tool with one or a few inwardly projecting teeth rotating at high speed, in order to machine a slowly rotating work-piece. Although the tool and the work-piece are not guided co-axially with one another in thread whirling, this process nevertheless gives some idea of the running-in process involved in a sealing ring according to the invention.

Preferred configurations of the invention are characterized in the subclaims.

Figure 1:
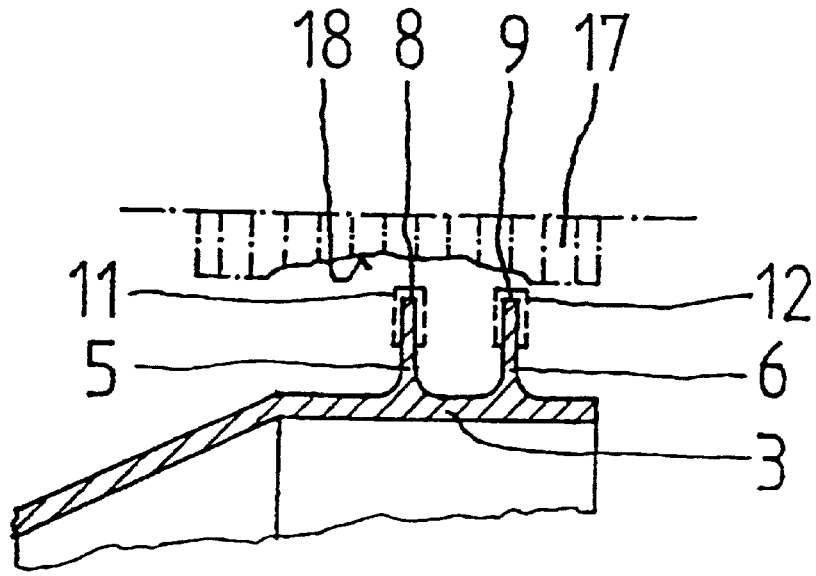
Figure 2:
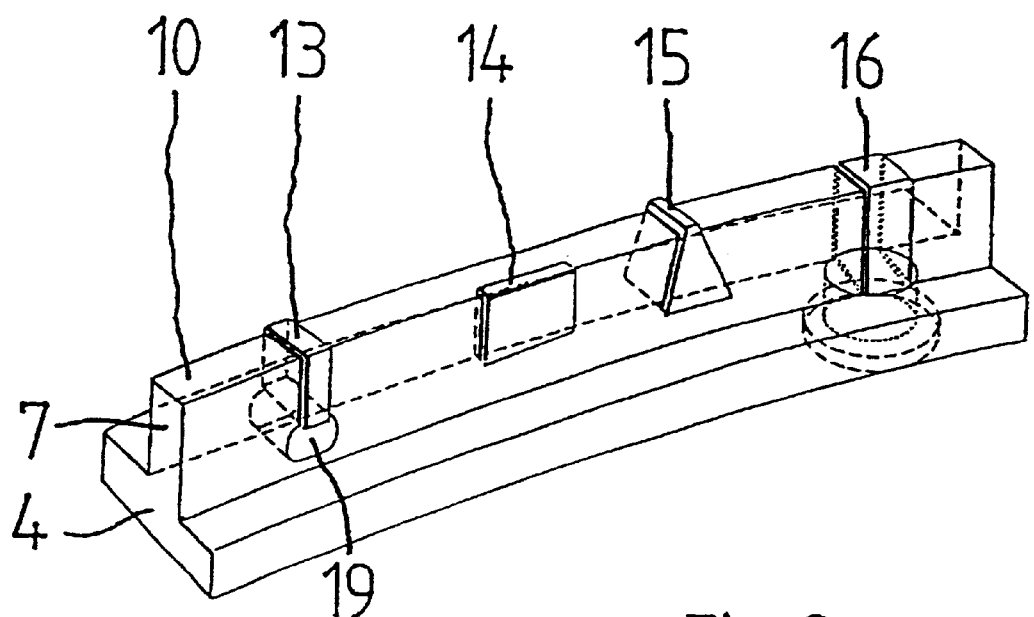

The invention will now be explained in more detail with reference to the drawings. These show a simplified representation, not to scale, of the following:

FIG. 1 a coaxial partial section through a sealing ring and a running-in surface interacting with the sealing ring, FIG. 2 a perspective partial view of a sealing ring with sealing elements of various types.

DETAILED DESCRIPTION OF THE DRAWINGS

The sealing ring 1 according to FIG. 1 comprises an at least largely rotationally symmetrical carrier 3, which is fixed to at least one adjoining, rotating component (not shown). Two sealing ribs 5,6 pointing radially outwards, which have a smooth, rotationally symmetrical contour over the greater part of their periphery, are arranged on the carrier 3. The exposed edges 8,9 of the ribs are therefore also largely smooth and rotationally symmetrical, that is to say circular cylindrical. It should be added that just one sealing rib or more than two sealing ribs may be arranged on one carrier, that the exposed edges of at least two sealing ribs may be graduated in diameter, that is different in size, and that all or some of the sealing ribs may also project radially inwards from the carrier.

The dashed contours 11, 12 indicate cutting elements and their rotational orbits. It will be seen that the cutting elements 11, 12 each project radially and axially on both sides over the sealing rib contours. This ensures that the sealing ribs 5,6 themselves, including their exposed sealing edges 8,9, virtually never come into contact with the opposing running-in surface 17, so that measures such as surface hardening, armouring etc. can as a rule be dispensed with.

As is common in practice, the running-in surface 17 represented by dashed lines as an adjoining, static sealing element is designed as a metal honeycomb structure, the material of which should be abradable with relatively few problems by machining, i.e. it should exhibit a certain ductility and defined fracturing properties.

Inside areas of the running-in surface 17 are abraded by relative radial and axial movements between sealing ring 1 and running-in surface 17 in excess of the initial radial clearance, so that after a full-load cycle, e.g. after one flight with manoeuvring, a characteristic running-in contour 18 is formed, which scarcely varies any more, if at all in further operation. The running-in contour 18 largely corresponds to an external envelope curve over all relative, maximum displacements of the cutting elements 11,12 that have occurred.

Since the running-in process constitutes only a small part of the component service life, it is possible on completion to remove the cutting elements or to machine them off flush with the sealing rib contour. Removable cutting elements may be replaced by replacement parts flush with the ribs. All of this would be feasible, for example, as part of a first engine overhaul.

FIG. 2 shows in detail various designs of cutting elements 13 to 16 on a sealing ring 2 with a radially outer sealing rib 7 on a carrier 4, the exposed, sealing edge 10 pointing upwards. A plate-shaped cutting element 13, which is arranged axially/radially, that is transversely to the sealing rib 7 and passing through the latter, can be seen on the left of the figure. It will be seen that the cutting element 13 projects radially (upwards) and axially on both sides (front right and rear left) from the sealing rib contour. The cutting geometry is not shown in detail, it being here left to the person skilled in the art to provide suitable angles, chip deflection and chip breaker facilities. The cutting element 13 will as a rule be composed of a harder material than the sealing rib 7, preferably of hard metal, ceramic or a composite material based on these. A material bonding connection by soldering or adhesive bonding, for example, to supplement the positive interlock is advisable, depending on the material. A relief bore 19 can also be seen, which is intended to prevent dangerous notch stresses in the sealing rib material at the foot of the cutting element 13. For sealing reasons the relief bore 19 may be sealed, for example with a plug, with adhesive or solder. The second cutting element 14 from the left is also of plate-shaped design, but it is arranged radially and essentially circumferentially on one side of the sealing rib 7 in a pocket-like depression. The unilateral arrangement requires that at least one pair of such cutting elements 14 be arranged per sealing rib, these possibly lying axially opposite one another or being offset in a circumferential direction.

The third cutting element 15 from the left differs from the first cutting element 13 in having a wedge shape, the axial/radial arrangement being the same. The wedge shape leads to a positive interlock fixing also in a radial direction, thereby providing a reliable safeguard against centrifugal forces. Additional bonded fixing is however effective in preventing axial migration. The wedge shape furthermore causes a "drawing" cut of the two lateral cutting edges. There may be effective stress-relief geometries in the area of the two lower wedge corners passing through the sealing rib 7, but they are not shown here. A special feature of the right-hand cutting element 16 is the purely positive interlock fixing. For this purpose it has circular cylindrical stepping in the foot area and is of rectangular design in the cutting edge/head area. It is installed by inserting radially into the sealing ring 2 from inside. Safeguards to prevent falling out inside may be fitted (not shown). A cutting element of this type admittedly has the disadvantage that locally it greatly reduces the supporting component cross section, so that the dimensions of the sealing ring carrier must be increased.

What is claimed is:

1. A sealing ring for non-hermetic fluid seals, the sealing ring comprising:

at least one circular sealing rib having an exposed smooth sealing surface over a greater part of an outer periphery of the sealing rib, the sealing surface in operation forming a flow restriction with a running-in surface situated radially opposite to the sealing surface; and at least one cutting element arranged on the outer periphery of the sealing rib, the at least one cutting element projecting radially and axially from the exposed smooth sealing surface of the sealing rib, wherein the at least one cutting element is composed of one of hard metal, ceramic-coated metal or ceramic and is connected to the sealing rib by at least one of a positive interlocking and bonded connection.

2. The sealing ring according to claim 1, wherein the at least one cutting element includes a plurality of cutting elements arranged at diametrical points on the sealing surface of the sealing rib.

3. The sealing ring according to claim 1, wherein the at least one cutting element is connected to the sealing rib by a bonded connection.

4. The sealing ring according to claim 3, wherein the bonded connection is a soldered connection.

5. The sealing ring according to claim 3, wherein the bonded connection is an adhesive connection.

6. The sealing ring according to claim 2, wherein the at least one sealing rib comprises a hard metal.

7. The sealing ring according to claim 3, wherein the at least one sealing rib comprises a hard metal.

8. The sealing ring according to claim 4, wherein the at least one sealing rib comprises a hard metal.

9. The sealing ring according to claim 2, wherein each sealing rib comprises a ceramic-coated metal.

10. The sealing ring according to claim 3, wherein each sealing rib comprises a ceramic-coated metal.

11. The sealing ring according to claim 10, wherein the bonded connection is an adhesive connection.

12. The sealing ring according to claim 2, wherein each sealing rib comprise s a ceramic material.

13. The sealing ring according to claim 3, wherein the at least one sealing rib comprises a ceramic material.

14. The sealing ring according to claim 13, wherein the bonded connection is an adhesive connection.

15. A method of making a sealing ring for non-hermetic fluid seals, the method comprising:

providing at least one circular sealing rib with an exposed smooth sealing surface over a greater part of an outer periphery of the sealing rib, the sealing surface forming a flow restriction with a running-in surface situated radially opposite to the sealing surface; and attaching at least one cutting element to the outer periphery of the sealing rib, the at least one cutting element projecting radially and axially from the exposed smooth sealing surface of the sealing rib, wherein the at least one cutting element is composed of one of hard metal, ceramic-coated metal or ceramic and is connected to the sealing rib by at least one of a positive interlocking and bonded connection.

* * * * *